United States Patent [19]
Zillinger, Jr.

[11] 3,825,720
[45] July 23, 1974

[54] ADAPTER FOR A MIG WELDER
[76] Inventor: Adam J. Zillinger, Jr., 148 Minnewawa Ave., Fresno, Calif. 93727
[22] Filed: July 27, 1973
[21] Appl. No.: 383,098

[52] U.S. Cl. ............................................. 219/130
[51] Int. Cl. ............................................. B23k 9/26
[58] Field of Search ...................... 219/130, 136

[56] References Cited
UNITED STATES PATENTS
3,103,576  9/1963  Miller .............................. 219/130
3,143,633  8/1964  Wadleigh ......................... 219/130
3,366,774  1/1968  Nuss et al. ........................ 219/136
3,529,126  9/1970  Reeh ................................ 219/130

Primary Examiner—J. V. Truhe
Assistant Examiner—N. D. Herkamp
Attorney, Agent, or Firm—Huebner & Worrel

[57] ABSTRACT

An adapter for a welding tool to maximize the useful life of a welding wire feed tube for the tool, the adapter having an elongated tool engaging shank; a tube receiving sleeve borne by the shank; and a tube lock ring secured on the sleeve.

3 Claims, 3 Drawing Figures

PATENTED JUL 23 1974 3,825,720

ADAPTER FOR A MIG WELDER

BACKGROUND OF THE INVENTION

The present invention relates to an adapter for welding tools and more particularly to such an adapter which permits welding wire feed tubes employed in such tools to have greatly extended operational lives and therefore to enhance the economy with which welding tools can be operated.

The prior art patents such as the Miller U.S. Pat. No. 3,103,576; the Bernard et al, U.S. Pat. No. 3,469,070; and the Carkhuff U.S. Pat. No. 3,541,298 relate to a variety of devices which are not adapted to perform the function of the present invention but may be regarded as of interest.

In various forms of gas fusion welding, such as gas-shielded-arc welding, a continuous welding wire is fed through the welding tool at a pre-selected speed during the welding process. The welding tool is connected to a source of gas, such as helium, argon, or carbon dioxide. The tool mounts a cylindrical gas nozzle shield which extends therefrom in fixed relation to direct the gas to the precise position in which welding is to be performed. Mounted internally of the shield is an endwardly adjustable tube, normally fabricated from copper, which is adapted to guide the wire to the precise point at which welding is to occur. In order to operate properly, the end of the tube should extend just beyond the end of the gas nozzle shield.

It is a common occurrence during such welding to have the welding wire fuse to the end of the tube. This requires the tube to be severed inwardly of the fused area to permit the welding wire again to be fed out the end of the tube. Since severing of the tube, of course, shortens its length, the tube must be adjusted outwardly so as again to position its end extended just beyond the nozzle shield. Because of the fixed relationship between the chuck and the end of the nozzle shield, only somewhat less than half the length of such a tube can be used before it becomes too short to employ. The necessity of discarding such partially used tubes can involve signigicant expense over a relatively short period of time particularly where welding is performed with frequency.

Therefore, it has long been recognized that it would be desirable to have a device which significantly extends the conventional operating life of such tubes so as to minimize the expenses incurred in welding operations and which is easy to operate.

SUMMARY OF THE INVENTION

In view of the foregoing, it is an object of the present invention to provide an improved welding tool adapter.

Another object is to provide such an adapter which significantly extends the operational life of welding wire feed tubes employed on welding tools.

Another object is to provide such an adapter which is capable of being employed on a variety of types of welding tools which employ continuous feed welding wire.

Another object is to provide such an adapter which permits adjustment of the effective operating length of wire feed tubes so as to permit precise positioning of the ends of such tubes.

Another object is to provide such an adapter which does not interfere with the normal operation of a welding tool on which it is mounted.

A further object is to provide such an adapter which is of minimal expense.

A still further object is to provide such an adapter which is easy to use and adjust during the welding operation.

Further objects and advantages are to provide improved elements and arrangements thereof in a device for the purposes described which is dependable, economical, durable and fully effective in accomplishing its intended purposes.

DESCRIPTION OF THE PREFERRED EMBODIMENT

Figure 1:
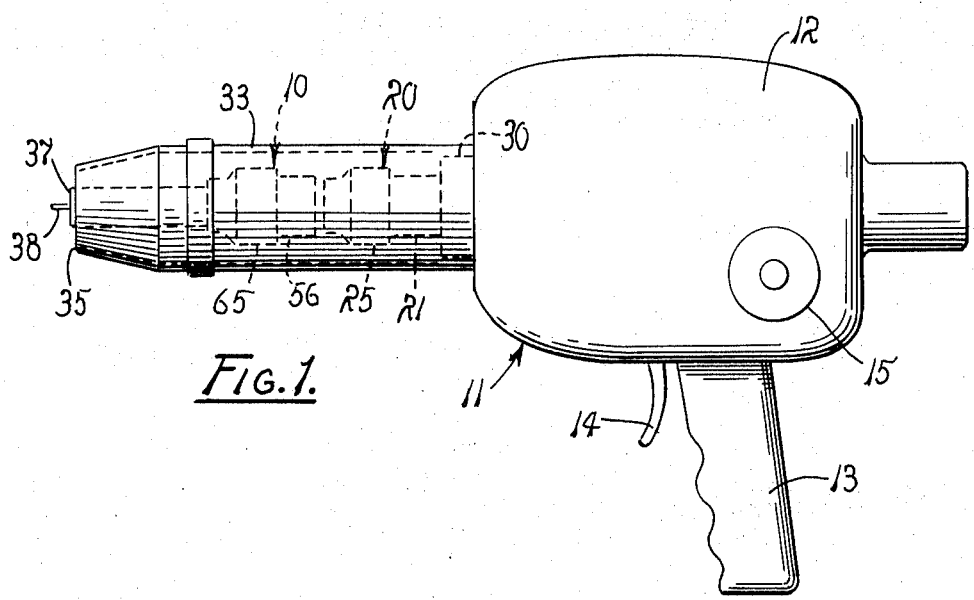
FIG. 1 is a side elevation of a welding tool having the adapter of the present invention mounted thereon.
Figure 2:
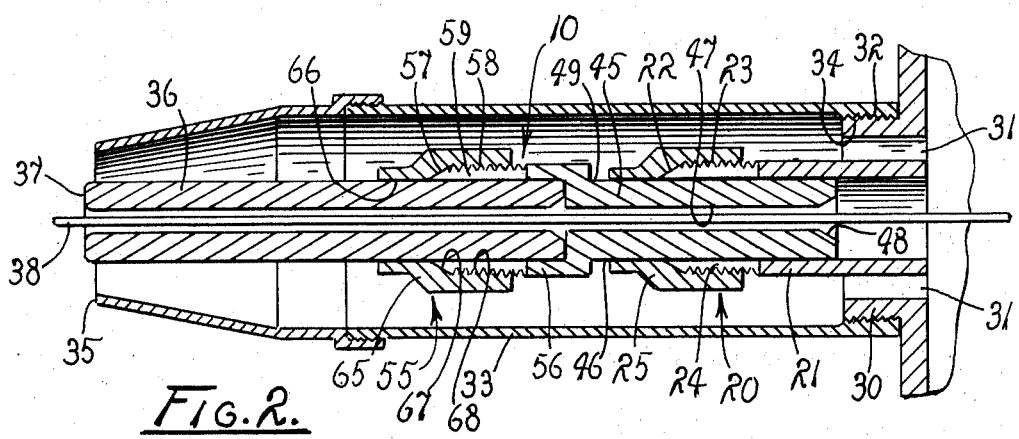
FIG. 2 is a somewhat enlarged fragmentary longitudinal vertical section of the welding tool.
Figure 3:
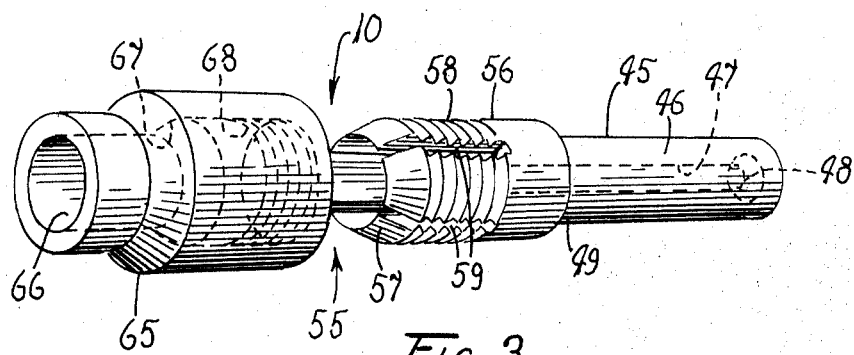
FIG. 3 is an exploded view of the adapter.

Referring more particularly to the drawing, the adapter of the present invention is generally indicated at 10 in FIG. 2. The adapter is designed to be mounted on any of the variety of types of welding tools which employ a continuously fed welding wire. As shown and described herein, the welding tool is of the inert-gas, metal-arc variety and is generally typified at 11 in FIG. 1. The tool has a housing 12 providing a grip 13 fastened thereon. A tool actuating trigger 14 is operably mounted on the housing adjacent to the grip for ease of operation. A wire feed control knob 15 is secured on the housing.

The housing 12 of the welding tool 11 has a forwardly extending chuck 20. The chuck includes a cylindrical projection 21 mounted on and extended from the housing. The projection has an outwardly, peripherally tapered remote end 22. External screw threads 23 extend about the projection immediately adjacent to the tapered remote end thereof. The projection has compression slots 24 extending longitudinally thereof from the remote end through the screw threads. A nut 25 is screw-threadably received on the screw threads of the projection and adapted to be tightened against the tapered remote end so as to bind the projection about an object received therein.

The housing 12 of the welding tool 11 has a mount 30 extending therefrom concentrically about the cylindrical projection 21 of the chuck 20. The mount is concentrically spaced from the projection so as to define a gas passage 31. The gas passage communicates with a source, not shown, of a suitable gas under pressure, such as helium, argon or carbon dioxide. The tool is adapted to discharge gas from the source through the gas passage upon the depression of the actuating trigger 14. The mount has external screw threads 32 extending thereabout. A gas nozzle shield 33, having an internally screw-threaded end 34 and an opposite tapered remote end 35, is mounted on the mount 30 with the end 34 screw-threadably received on the screw threads 32 of the mount. A conventional wire feed tube 36, having a remote end 37, is adapted to be received in the conventional manner in the chuck 20 and to be locked into position by the nut 25 with its remote end positioned just outwardly of the remote end 35 of the gas nozzle shield.

A welding wire is shown at 38. The wire is retained on a reel, not shown, from which it is fed by the tool upon depression of the trigger 14. During such conventional operation of the tool, the welding wire is driven from the reel through the chuck and the tube. The wire control knob 15 is operated to control the rate of speed at which the welding wire is fed by the tool.

The welding tool adapter 10 of the present invention has an enlongated shank 45 having a substantially cylindrical exterior surface 46. The shank is axially pierced by a material supply passage or bore 47. The shank has a countersunk end 48 and an opposite end 49.

A chuck 55 is borne by the opposite end 49 of the shank 45 in axial alignment therewith. The chuck has a substantially cylindrical sleeve 56 integrally secured on the opposite end of the shank in axial alignment therewith. The sleeve has a peripherally, outwardly tapered remote end 57 and circumscribing external screw threads 58 extending thereabout adjacent to the remote end. Circumferentially spaced compression slots 59 are formed in the sleeve extending from the remote end thereof longitudinally of the sleeve through the screw threads.

The chuck 55 further includes a jam nut 65. The jam nut has an axial passage 66 extending therethrough having a diameter corresponding to the interior diameter of the sleeve. A countersunk bore 67 extends inwardly from one end of the nut in axial alignment with the passage. Screw threads 68 are formed in the interior of the bore. The jam nut, employing the screw threads 68, is adapted to be screw-threadably mounted on the external screw threads 58 of the sleeve.

OPERATION

The operation of the described embodiment of the subject invention is believed to be clearly apparent and is briefly summarized at this point. As previously discussed, the remote end of the feed tube 36 must be positioned just beyond the remote end 35 of the gas nozzle shield 33, as shown in FIG. 1, for proper operation. During welding, the wire 38 frequently fuses to the remote end 37 of the tube requiring severance of the tube. To place the tool again in operable condition, the chuck 20 must be adjusted to mount the tube in the aforementioned optimum operating position. When the tube 36 has been shortened by such severing to somewhat greater than one half its original length, it is too short to be adjusted within the chuck 20 to extend the remote end 37 of the tube to the optimum position just beyond the remote end 35 of the nozzle shield 33. Such a tube is conventionally discarded and replaced with a new tube.

By employing the welding tool adapter 10 of the present invention, such a shortened tube 36 can be retained for a substantial additional period of use.

Mounting of the adapter on the welding tool 11 is accomplished by first screw-threadably removing the end 34 of the shield 33 from the mount 30. The nut 25 of the chuck 20 is then loosened and the feed tube 36 removed therefrom. Subsequently, the shank 45 of the adapter is inserted in the projection 21 of the chuck and the nut again tightened to lock the shank in the selected position. Thereafter, the feed tube is simply inserted in the sleeve 56 of the chuck 55 and the jam nut 65 tightened to compress the sleeve about the feed tube so as to lock it in the selected position.

Precise positioning of the feed tube 36 within the sleeve can be accomplished by simply holding the shield 33 against the housing 12 of the tool 11 parallel to the projection 21 and simultaneously positioning the remote end 37 of the tube just beyond the remote end 35 of the shield prior to tightening the jam nut 65. Subsequently, the gas nozzle shield is again secured on the mount 30. The welding tool 11 is then fully operable. When severing of the feed tube 36 is again required, adjustment of both the chuck 20 and the chuck 55 permit extension of the remote end of the feed tube to accommodate the reduction in the length of the tube. Thus, the usable operating life of such tubes is vastly increased. Experience has shown that an additional 2½ inches of each tube can be utilized when the adapter of the present invention is employed as described.

Therefore, use of the adapter of the present invention significantly extends the conventionally available operating life of welding wire feed tubes used in various types of welding operations so as to minimize the operating expenses involved therewith, the adapter being usable on conventionally available welding tools without modification of such tools and affording an ease of operation which facilitates use of the tools.

Although the invention has been shown and described in what is conceived to be the most practical and preferred method and apparatus, it is recognized that departures may be made therefrom within the scope of the invention, which is not to be limited to the illustrative details disclosed.

Having described my invention, what I claim as new and desire to secure by letters patent is:

1. A welding tool adapter for a welding tool having a chuck adapted to mount an endwardly consumable welding wire feed tube for periodic endward repositioning to accommodate consumption of said tube by maintaining a foreshortened end of said tube in juxtaposition to a predetermined welding position on the tool, the adapter comprising a tube receiving sleeve; a lock ring borne by the sleeve adapted to secure a tube in the sleeve; and an elongated shank integral with and in substantial axial alignment with the sleeve adapted to be secured in the chuck for selected endward adjustment to position the foreshortened end of a tube received in the sleeve in juxtaposition to the welding position to extend the normal consumable life of the tube beyond that afforded by the welding tool chuck.

2. In combination with a welding tool having a chuck, a feed tube endwardly consumable during welding releasibly secured in the chuck and having an end remote from said chuck foreshortened during consumption of the tube, means for impelling welding wire from the welding tool through the tube and out its remote end, a nozzle mounted on the tool substantially concentrically about the chuck and having a remote end and means for directing gas through said nozzle and about the remote end of the tube; a welding tool adapter comprising an elongated substantially cylindrical shank adapted to be locked in the chuck in a range of longitudinal positions and being longitudinally pierced by a substantially coaxial welding wire transmitting bore; a sleeve endwardly mounted on the shank in substantially axial alignment therewith and having a longitudinal slot therein; screw threads circumscribing the sleeve adjacent to the slot; and an internally screw-threaded lock ring, having an internal cam surface, adapted to be screw-threadably secured on the sleeve with the feed tube received therein and the cam surface engaging said sleeve compressibly to lock the feed tube on the adapter affording an increased range of longitudinal adjustment for the remote end of the feed tube relative to the remote end of the nozzle to accommodate endward consumption of said tube.

3. In a welding tool having a first chuck and a feed tube through which a welding wire is projected, an auxiliary attachment comprising an elongated shank having a passage therethrough, an end mounted in the first chuck for longitudinal telescopic adjustment therein, and an opposite end; and a second chuck mounted on said opposite end of the shank mounting the feed tube therein for longitudinal telescopic adjustment in alignment with the passage of the shank whereby the longitudinal positioning of the feed tube relative to the tool has a range including the telescopic adjustment of the shank in the first chuck and the telescopic adjustment of the feed tube in the second chuck.

* * * * *

UNITED STATES PATENT OFFICE
CERTIFICATE OF CORRECTION

Patent No. 3,825,720              Dated July 23, 1974

Inventor(s)            Adam J. Zillinger, Jr.

It is certified that error appears in the above-identified patent and that said Letters Patent are hereby corrected as shown below:

<u>In the Title</u>:

Delete "Adapter For A Mig Welder" and in lieu thereof insert ---Welding Tool Adapter---.

Signed and sealed this 12th day of November 1974.

(SEAL)
Attest:

McCOY M. GIBSON JR.            C. MARSHALL DANN
Attesting Officer              Commissioner of Patents

FORM PO-1050 (10-69)